United States Patent [19]

Cha et al.

[11] Patent Number: 5,225,222
[45] Date of Patent: Jul. 6, 1993

[54] SURFACE-COATING FOR PRODUCING MICROBIOLOGICALLY-STABLE BAKED GOODS

[75] Inventors: Alice S. Cha, Mt. Kisco; William H. Povall, Jr., Fishkill; Frank J. Pinteno, Westbury, all of N.Y.

[73] Assignee: Kraft General Foods, Inc., Northfield, Ill.

[21] Appl. No.: 595,159

[22] Filed: Oct. 10, 1990

[51] Int. Cl.$^5$ .............................................. A21D 15/08
[52] U.S. Cl. ........................................ 426/89; 426/302; 426/310; 426/549; 426/653; 426/654; 426/94
[58] Field of Search ...................... 426/89, 92, 94, 102, 426/272, 273, 573, 100, 302, 310, 549, 653, 654

[56] References Cited

U.S. PATENT DOCUMENTS

| | | | |
|---|---|---|---|
| 3,445,243 | 5/1969 | Moirano | 426/573 |
| 3,682,654 | 8/1972 | Johnson | 426/89 |
| 3,900,574 | 8/1975 | Warwick | 426/582 |
| 4,140,807 | 2/1979 | Braverman | 426/573 |
| 4,196,219 | 4/1980 | Shaw et al. | 426/89 |
| 4,307,124 | 12/1981 | Moirano | 426/573 |
| 4,515,822 | 5/1985 | Kraig et al. | 426/445 |
| 4,645,674 | 2/1987 | Lang et al. | 426/94 |
| 4,863,751 | 9/1989 | Voss | 426/532 |

OTHER PUBLICATIONS

Banwart, G. J., Basic Food Microbiology, 1981, pp. 82, 88, AVI Publishing Co., Inc., Westport, Conn.
Branen, et al., Antimicrobials in Foods, pp. 141, 146, 157–159 (Marcel Dekker, Inc. 1983).
Torres and Karel, "Microbial Stabilization of Intermediate Moisture Food Surfaces", Journal of Food Processing and Preservation, vol. 9, No. 2, pp. 107–119.

*Primary Examiner*—Joseph Golian
*Assistant Examiner*—Leslie Wong
*Attorney, Agent, or Firm*—Thomas R. Savoie

[57] ABSTRACT

High-moisture food products are surface-coated with a coating comprised of 80 to 99.5% water, 0.1 to 3% sorbic acid or a salt thereof, and 0.2 to 3% kappa-carrageenan. The coating has a pH of 3.5 to 5.5 and sets at a temperature above 100° F. The coating is well-suited for application to baked goods such as soft pies.

17 Claims, No Drawings

SURFACE-COATING FOR PRODUCING MICROBIOLOGICALLY-STABLE BAKED GOODS

BACKGROUND OF THE INVENTION

1. Field of the Invention

The present invention relates to a surface coating which may be used to provide microbiological stability to high-moisture foodstuffs. More particularly, this invention relates to forming a clear, gel-like coating on the surface of foodstuffs having an exposed surface which exhibits a water activity above 0.9. The practice of this invention enables distribution and sale of such foodstuffs at ambient temperature.

2. Description of the Prior Art

High-moisture foodstuffs, such as cheese cake, pumpkin pie, custard pie, dessert gels and the like, present exposed surfaces to the air which are highly-susceptible to microbiological contamination. Many of these products, such as fresh-baked goods (e.g., pies and cakes) may be packaged in cardboard boxes which are not air-tight and are thus subject to microbial attack from ambient atmosphere. High-moisture products, such as fruit pies and cheese cake, are subject to spoilage when held at ambient conditions for a period of several days. The use of refrigerated distribution and storage could be used to extend the life of these products but this, of course, increases costs and limits distribution and sale of the product.

The use of glazes or coatings to prevent microbial spoilage of foodstuffs is known in the art. Such coatings, however, have not proven to be satisfactory for use with high-moisture foodstuffs. Coatings for foodstuffs, such as baked goods, must not detract from the appearance or taste of the product, must not dry out and/or crack during the distribution and use cycles of the product and must not cause operational problems in the manufacturing facility as a result of their use.

In an article entitled, "Microbial Stabilization Of Intermediate Moisture Food Surfaces"by J. A. Torres and M. Karel (Journal Of Food Processing And Preservation, Vol. 9, No. 2, p. 107-119), the use of reduced surface-pH and surface concentration of preservative are identified as techniques to improve microbial surface stability. U.S. Pat. No. 4,863,751 to Voss discloses a liquid, shelf-stable, preservative-containing coating for bakery products, U.S. Pat. No. 4,645,674 to Lang et al. discloses a sorbate and acid-containing coating for bakery products. Both of these patented bakery coatings are designed for use on relatively-low $A_w$ bread and roll-type baked goods and neither of these patents disclose the use of gelled coatings. U.S. Pat. No. 4,196,219 to Shaw et al. discloses a process for extending the life of pre-cooked meats, poultry and fish by the application of a coating of an aqueous dispersion of the calcium salt of carrageenan (i.e., iota carrageenan).

SUMMARY OF THE INVENTION

This invention describes a gellable coating composition for use on microbiologically-sensitive surfaces (i.e., surfaces which exhibit a water activity of 0.9 or more) of foodstuffs, such as fruit pies, cheese cakes, gelatin gels. The coating composition, as applied, will contain water at from 80 to 99.5%, an acidifying agent at a level effective to produce a pH of from 3.0 to 5.5 and sorbic acid, or a salt thereof, at a level of 0.1 to 3%. Further, the coating contains kappa-carrageenan at a level of from 0.2 to 3.0%, said level being effective, either alone or in combination with other gums present in the coating composition, to produce a coating which will set at a temperature above 100° F. (37.8° C.), typically at a temperature within the range of 105° F. (40.6° C.) to 125° F. (51.6° C.).

The coating composition is applied to the microbiologically-sensitive surfaces of the foodstuff while the foodstuff is at an elevated temperature, typically above about 110° F. (43.3° C.). In the case of baked goods the coating will be applied shortly after the baked good exits the oven. Since the coating of this invention will gel at a relatively high temperature, the coating rapidly forms a continuous barrier layer which is resistant to microbial attack from such airborne pathogens as *Staphylococcus aureus*.

Various carbohydrate materials, such as sugars, starches and/or dextrins, may be added to the coating composition to improve the functional properties of the coating. The coating will typically be applied to the foodstuff at a thickness ranging from 0.005 to 0.1 cm. All percents given in the description and claims of this invention are weight percents. This invention is described in detail in connection with fresh baked goods which expose one or more high moisture surfaces to ambient environment; however, it is not intended that the invention be so limited.

DETAILED DESCRIPTION OF THE INVENTION

This invention relates to a unique composition for use as an antimicrobial coating to be applied to microbiologically-sensitive food products. The coating of this invention is suited for application to soft pies, such as pumpkin, squash, custard, cheese, cream, fruit and the like, but is also well-suited for cakes, such as cheese cake, fruit cake, Bavarian cream coffee cake and the like, and danish pastry, such as fruit danish and cheese danish. The antimicrobial coating of this invention will find use as a surface coating to any high-moisture surface exhibiting an $A_w$ of 0.9 or more, typically 0.94 to 0.98, and is particularly applicable to the surfaces of food products which have a pH of from 5.0 to 8.0.

The coating composition will be formulated to have a pH of from 3.0 to 5.5, typically 4.5 to 5.2, and will usually have a lower pH than the food product being coated. The composition will contain an edible acidifying agent, such as malic, tartaric, acetic and/or citric acid. The coating will also contain as a preservative sorbic acid or a salt thereof at a level of from 0.1 to 3%, typically about 0.3 to 0.8%. Potassium sorbate is the preferred preservative.

The coating composition of this invention forms a substantially clear gel and is able to quickly set when applied to the surface of hot, cooked or freshly-baked foodstuffs. It is desirable that the coating be applied and set as soon as possible after the microbiologically-sensitive food product exits a baking, cooking or other heating step which has killed or otherwise inactivated any microbes contained in the foodstuff. The kappa carrageenan and sorbic acid-containing, coating of this invention is thus able to serve as a post-process contamination or microbial barrier layer for the microbiologically-sensitive foodstuff. It will, therefore, be necessary that the coating composition set within 2.5 minutes at a temperature no lower than 100° F. (37.8° C.) and preferably at a temperature within the range of 105° F. (40.6° C.) and 125° F. (51.6° C.).

It has been found that kappa-carrageenan is uniquely able to produce a clear gel which quickly sets at relatively high temperatures. Thus the coating composition of this invention must contain kappa-carrageenan at a level of from 0.2 to 3%, typically from 0.4 to 1.5%. Other gums, such as locust bean gum, guar gum, iota carrageenan or the like, may be included in the coating formulation. These other gums could be used to modify the properties of the coating and, if used, would be included in the formulation at a level which is no higher than the level of kappa-carrageenan. The coatings of this invention do not exhibit syneresis or cracking over a period of several days, even when subjected to the temperature cycling normally incurred by ambient-temperature, bakery distribution systems. The coating will also substantially reduce moisture migration from the high-moisture foodstuff to the surrounding atmosphere.

Kappa-carregeenan has been found to be uniquely functional for use in this invention. A combination of gum arabic and gelatin (Sealgum TM, from Colloides Natural, Inc.) does not set in the acidic, sorbate-containing coatings of this invention. Gum arabic (Spraygum TM, from Colloides Natural, Inc.) by itself was found to produce a dull-looking appearance and to form a white foam during spray-on application of the coating. Calcium alginate, formed by the two-step application of a sodium alginate solution and a calcium salt solution, was not satisfactory from an operational sense due to the necessity of a two-step application. The use of dextrins, such as taught in the aforementioned Lang et al. patent, was not satisfactory since a gelling time of several hours was necessary. Starches, such as waxy maize starch(Mira-Cap TM, from A. E. Staley Mfg. Co.), produced a dull-looking appearance and formed a white foam during spray-on application of the coating. Zein was not acceptable due to the necessity of employing alcohol as a solvent, and a solution of zein, glycerol, emulsifier (Myvacet ®, acetylated monoglyceride from Eastman Kodak Co.) and ethanol was found to produce such a strong moisture and gas barrier that hot air could not escape from the surface of the freshly baked or cooked food product. Iota carrageenan of predominantly sodium salt form did not form a gel and iota carrageenan of predominantly calcium salt form formed a gel which was too elastic for use. The lambda form of carrageenan is unacceptable since it does not form a gel.

The coating composition of this invention may include additional materials which can improve the physical characteristics of the coating. A sugar (e.g., sucrose, dextrose, etc.) or a hydrolyzed starch material (e.g., dextrin, corn syrup solids) may be included in the coating composition at levels from 2 to 12%, typically from 4 to 11% for the purpose of increasing the gel strength, clarity and/or elasticity of the coating. A starch (e.g., corn, tapioca, potato, etc.) component may also be added to the coating composition at a level of from 0.5 to 4%, preferably from 0.8 to 2.5%, in order to increase the hot fluid viscosity of the coating. The coating composition could also include color and/or flavor agents, as desired.

In operation, the coating composition is held at a temperature above its setting temperature and typically will be held at 130° to 150° F. (54.4° to 65.6° C.). The higher the potassium level of the kappa-carrageenan, the higher the setting temperature of the coating will be. Unacceptable reductions in gel strength can result if the coating solution has a pH of below about 4.0 and is maintained at these elevated temperatures for more than several hours. A spray-on or pour-on technique can be utilized for application of the coating. Typically, the coating is applied to a thickness of from 0.005 to 0.1 cm.

This invention is described in the operative example in terms of its use with soft pies, such as pumpkin pie; however, the scope of the invention is not intended to be limited thereto.

EXAMPLE 1

A coating solution was prepared by adding 15 grams of sucrose, 3 grams of corn starch, 1.5 grams of kappa-carrageenan (Gelcarin DG 812 available from The Marine Colloids Division of FMC) and 1.4 grams of potassium sorbate to 250 grams of cold tap water. The pH of the solution was then brought down to 4.6 by the addition of about 0.58 grams of citric acid. The solution was then brought to a boil with constant stirring and then held at 140° F. in an agitated, temperature-regulated holding tank. The setting temperature of this coating was found to be 120° F.

EXAMPLE 2

| Pumpkin Pie Filling | Weight (Pounds) |
|---|---|
| Corn Starch | 3.75 |
| Spice Blend | 4.38 |
| Salt | 1.75 |
| Stabilizer | 0.75 |
| Sorbic Acid | 0.63 |
| Whole Dry Milk | 37.5 |
| Pumpkin | 186.0 |
| Sugar | 55.5 |
| Corn Syrup Solids (42 D.E.) | 34.5 |
| Liquid Eggs | 42.0 |
| Water | 153.0 |
| Flavor | 1.13 |

A pre-blend of the starch, spice blend, salt, stabilizer, sorbic acid and dry milk was made. The pre-blend, pumpkin, sugar, corn syrup solids, were mixed until smooth and then the eggs, water and flavor were added. This filling which had a solids content of about 40%, a pH of about 5.9 was placed in shaped, 8-inch, pie dough shells (bottom crusts) at a level of 22 ounces (weight) per pie. The pies were baked at 425° F. for 25-30 minutes. After baking the exposed pie surface had an Aw of about 0.96-0.98. The coating of Example 1 was sprayed onto the exposed top surface of the pumpkin pie at a level of about 15 grams per pie. The coating was applied to the pies within 30 to 60 seconds after the pies exited the oven by means of a two-disc pie glazer. The resulting coating had a thickness of about 0.05 cm and quickly solidified as the temperature of the filling cooled to below 120° F.

The pies had superior eye appeal, were free of objectionable flavor and were stable to microbial spoilage (especially *Staphylococcus aureus*) throughout an unrefrigerated period of seven days. Microbiological evaluation established that zero-time recovery data for contact of *Staphylococcus aureus* with the gelled coating results in near instantaneous three log cycle reduction in viability. Growth of *Staphylococcus aureus*, or other microbes, in the presence of the glaze failed to occur over a sixteen day incubation period at either 25° or 35° C.

We claim:

1. A surface-coated, microbiologically-stable, high-moisture baked good wherein the uncoated baked good has a water activity of 0.9 or more and a pH of 5.0 to 8.0 and wherein the surface coating is a substantially-clear gel, has a pH of 3.5 to 5.5 a lower pH than the pH of the baked good being coated, contains, on a weight basis, sorbic acid or a salt thereof at a lever of from 0.1 to 3%, kappa-carrageenan at a level of 0.2 to 3% and effective to produce a coating which sets at a temperature above 100° F, and water from 80 to 99.5%.

2. The surface-coated baked good of claim 1 wherein the coating composition includes potassium sorbate.

3. The surface-coated baked good of claim 1 wherein the surface coating contains an acidifying agent in an amount effective to produce a coating pH of 4.5 to 5.2.

4. The surface-coated baked good of claim 1 wherein the baked good is selected from the group consisting of pies, cakes, and danish.

5. The surface-coated baked good of claim 1 wherein the baked good is a pie having a filling and a bottom crust with the surface coating being applied to the exposed top surface of the pie filling.

6. The surfacecoated pie of claim 5 wherein the pie filling is selected from the group consisting of pumpkin, squash, custard and cheese.

7. The surface-coated pie of claim 5 wherein the filling has a water activity of 0.90 to 0.98.

8. The surface-coated baked good of claim 1 wherein the coating has a sugar or hydrolyzed starch content of 2 to 12% and a starch content of 0.5 to 4.0%.

9. The surface-coated baked good of claim 8 wherein the coating contains sucrose at from 2 to 12%.

10. The surface-coated baked good of claim 8 wherein the starch is corn starch, tapioca starch or potato starch.

11. The surface-coated pie of claim 5 wherein the coating has a thickness of 0.005 to 0.1 cm.

12. The surface-coated baked good of claim 4 wherein the coating is sprayed onto the surface of the baked good within about one minute after the baked good exits the oven.

13. The surface-coated baked good of claim 1 wherein the coating is held in a reservoir at a temperature of 130° to 150° F.

14. The surface-coated baked good of claim 1 wherein the kappa carrageenan level is 0.4 to 0.9%.

15. The surface-coated baked good of claim 9 wherein the sucrose level is 4 to 7%.

16. The surface-coated baked good of claim 10 wherein the starch level is 0.8 to 1.5%.

17. The surface-coated pie of claim 6 wherein the coating has a pH of 4.5 to 5.2.

* * * * *